(12) United States Patent
Onishi et al.

(10) Patent No.: US 8,196,404 B2
(45) Date of Patent: Jun. 12, 2012

(54) EXHAUST GAS RECIRCULATION SYSTEM FOR INTERNAL COMBUSTION ENGINE AND METHOD FOR CONTROLLING THE SAME

(75) Inventors: Tomomi Onishi, Susono (JP); Shigeki Nakayama, Susono (JP); Teruhiko Miyake, Toyota (JP); Masahiro Nagae, Nishikamo-gun (JP); Hajime Shimizu, Susono (JP); Isao Matsumoto, Suntou-gun (JP); Tomoyuki Ono, Sunotu-gun (JP); Hiroki Murata, Gotenba (JP); Akira Yamashita, Susono (JP); Hiroyuki Haga, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 519 days.

(21) Appl. No.: 12/298,788

(22) PCT Filed: Nov. 6, 2007

(86) PCT No.: PCT/IB2007/003365
§ 371 (c)(1),
(2), (4) Date: Oct. 28, 2008

(87) PCT Pub. No.: WO2008/056226
PCT Pub. Date: May 18, 2008

(65) Prior Publication Data
US 2009/0223221 A1    Sep. 10, 2009

(30) Foreign Application Priority Data
Nov. 6, 2006 (JP) .................. 2006-300295

(51) Int. Cl.
*F02B 33/44* (2006.01)
*F02B 77/08* (2006.01)
*F02D 23/00* (2006.01)
*F02D 17/04* (2006.01)
*F02M 25/07* (2006.01)

(52) U.S. Cl. ............. 60/605.2; 60/601; 123/568.12; 123/568.21; 123/198 DB; 701/108

(58) Field of Classification Search ............ 60/605.2, 60/600–601; 123/568.12, 568.21, 198 DB; 701/108; F02M 25/07
See application file for complete search history.

(56) References Cited

U.S. PATENT DOCUMENTS
6,694,956 B2 *  2/2004  Kawaguchi et al. ..... 123/568.21
(Continued)

FOREIGN PATENT DOCUMENTS
EP          1 420 159 A       5/2004
(Continued)

OTHER PUBLICATIONS

A machine translation the reference to Ishimori Takashi (Pub. No. JP 2004-156572 A), published on Jun. 3, 2004.*

(Continued)

*Primary Examiner* — Thai Ba Trieu
(74) *Attorney, Agent, or Firm* — Sughrue Mion, PLLC (57) ABSTRACT

An exhaust gas recirculation system includes a high-pressure EGR unit; a low-pressure EGR unit; a high-pressure EGR valve; a low-pressure EGR valve; and an EGR control unit that adjusts the opening amount of the high-pressure EGR valve to a required value for achieving the target EGR rate based on the characteristics of the exhaust gas in the low-pressure EGR passage before the operation mode is changed, and that maintains the required value during a period from when the operation mode is changed until when the low-pressure EGR gas is changed to the exhaust gas discharged from the internal combustion engine in the post-change operation mode.

28 Claims, 5 Drawing Sheets

U.S. PATENT DOCUMENTS

| | | | |
|---|---|---|---|
| 6,820,599 B2 * | 11/2004 | Kurtz et al. | 123/568.21 |
| 6,863,058 B2 * | 3/2005 | Kurtz et al. | 123/672 |
| 6,988,365 B2 * | 1/2006 | Sasaki | 60/605.2 |
| 7,025,042 B2 * | 4/2006 | Gray, Jr. | 123/435 |
| 7,273,045 B2 * | 9/2007 | Kurtz et al. | 60/605.2 |
| 7,367,188 B2 * | 5/2008 | Barbe et al. | 60/605.2 |
| 7,367,330 B2 * | 5/2008 | Yoshidome | 123/672 |
| 7,370,644 B2 * | 5/2008 | Wang | 123/568.12 |
| 7,380,400 B2 * | 6/2008 | Barbe et al. | 60/605.2 |
| 7,493,762 B2 * | 2/2009 | Barbe et al. | 60/605.2 |
| 7,512,479 B1 * | 3/2009 | Wang | 123/568.21 |
| 7,681,394 B2 * | 3/2010 | Haugen | 60/605.2 |
| 7,895,838 B2 * | 3/2011 | Ono | 60/605.2 |
| 8,006,494 B2 * | 8/2011 | Nagae | 60/605.2 |
| 2004/0050375 A1 | 3/2004 | Arnold | 60/605.2 |
| 2005/0103014 A1 * | 5/2005 | Sasaki | 60/605.2 |
| 2007/0079614 A1 * | 4/2007 | Barbe et al. | 60/605.2 |
| 2007/0119172 A1 * | 5/2007 | Barbe et al. | 60/605.2 |
| 2007/0220864 A1 * | 9/2007 | Haugen | 60/286 |
| 2008/0022677 A1 * | 1/2008 | Barbe et al. | 60/605.2 |
| 2008/0295514 A1 * | 12/2008 | Ono | 60/605.2 |
| 2009/0038308 A1 * | 2/2009 | Nagae | 60/605.2 |
| 2009/0205617 A1 * | 8/2009 | Tonetti et al. | 123/568.18 |
| 2010/0000500 A1 * | 1/2010 | Shimizu et al. | 60/605.2 |
| 2010/0179745 A1 * | 7/2010 | Nakayama et al. | 701/108 |
| 2010/0199957 A1 * | 8/2010 | Furukawa et al. | 123/568.12 |
| 2010/0250103 A1 * | 9/2010 | Shimo et al. | 701/108 |
| 2011/0072783 A1 * | 3/2011 | Hepburn et al. | 60/274 |
| 2011/0072784 A1 * | 3/2011 | Hepburn et al. | 60/274 |
| 2011/0072787 A1 * | 3/2011 | Hubbard et al. | 123/703 |
| 2011/0073070 A1 * | 3/2011 | Ruhland et al. | 123/406.19 |
| 2011/0073088 A1 * | 3/2011 | Hubbard et al. | 123/703 |

FOREIGN PATENT DOCUMENTS

| | | |
|---|---|---|
| JP | 04-284147 A | 10/1992 |
| JP | 08-170540 A | 7/1996 |
| JP | 09-151761 A | 6/1997 |
| JP | 2002-021625 A | 1/2002 |
| JP | 2004-027956 A | 1/2004 |
| JP | 2004-156572 A | 6/2004 |
| JP | 2005-076456 A | 3/2005 |
| JP | 2005-127247 A | 5/2005 |
| JP | 2008303825 A * | 12/2008 |
| WO | WO 2008149212 A1 * | 12/2008 |

OTHER PUBLICATIONS

A machine translation the reference to Kishida Akihiko et al. (Pub. No. JP 08-170540 A), published on Jul. 2, 1996.*

A machine translation the reference to Kakegawa Toshiaki (Pub. No. JP 2002-021625 A), published on Jan. 2, 2002.*

* cited by examiner

FIG. 5A
FUEL INJECTION AMOUNT

FIG. 5B
EGR RATE

FIG. 5C
HPL VALVE OPENING AMOUNT

FIG. 5D
CARBON DIOXIDE CONCENTRATION IN HPL GAS

FIG. 5E
LPL VALVE OPENING AMOUNT

FIG. 5F
CARBON DIOXIDE CONCENTRATION IN LPL GAS

EXHAUST GAS RECIRCULATION SYSTEM FOR INTERNAL COMBUSTION ENGINE AND METHOD FOR CONTROLLING THE SAME

BACKGROUND OF THE INVENTION

1. Field of the Invention

The invention relates to an exhaust gas recirculation system for an internal combustion engine, and a method for controlling the same.

2. Description of the Related Art

An exhaust gas recirculation system that recirculates a portion of the exhaust gas back to an intake system of an internal combustion engine has been suggested in order to reduce the amount of nitrogen oxide (NOx) that is generated when fuel is burned in the internal combustion engine.

In recent years, a technology that makes it possible to perform EGR in a broader operating range of an internal combustion engine has been suggested. As described in, for example, Japanese Patent Application Publication No. 2005-076456 (JP-A-2005-076456), an exhaust gas recirculation system according to the technology includes a high-pressure EGR unit and a low-pressure EGR unit, and recirculates a portion of the exhaust gas back to the internal combustion engine while changing the EGR unit used for exhaust gas recirculation between the high-pressure EGR unit and the low-pressure EGR unit or using both the high-pressure EGR unit and the low-pressure EGR unit in combination, based on the operation mode of the internal combustion engine. The high-pressure EGR unit recirculates a portion of the exhaust gas back to the internal combustion engine through a high-pressure EGR passage that provides communication between an exhaust passage, at a portion upstream of a turbine of a turbocharger, and an intake passage, at a portion downstream of a compressor of the turbocharger. The low-pressure EGR unit recirculates a portion of the exhaust gas back to the internal combustion engine through a low-pressure EGR passage that provides communication between the exhaust passage, at a portion downstream of the turbine, and the intake passage, at a portion upstream of the compressor. Japanese Patent Application Publication No. 2004-027956 (JP-A-2004-027956) and Japanese Patent Application Publication No. 09-151761 (JP-A-09-151761) also describe technologies related to exhaust gas recirculation.

Because a low-pressure EGR passage is usually long, the amount of exhaust gas in the low-pressure EGR passage is relatively large. Accordingly, even when the operation mode of an internal combustion engine changes, it takes a relatively long time for the exhaust gas, which is discharged from the internal combustion engine in the pre-change operation mode and which still remains in the low-pressure EGR passage, to be entirely taken in cylinders of the internal combustion engine. During this time period, the exhaust gas, which has characteristics (the concentrations of the components, the temperature, etc, of the exhaust gas) different from those of the exhaust gas that is discharged from the internal combustion engine in the post-change operation mode is taken in the internal combustion engine. Accordingly, the oxygen concentration in the intake air (or the EGR rate) may deviate from the target oxygen concentration in the intake air (or the target EGR rate), resulting in an increase in the toxic substance contained in the exhaust gas, incomplete combustion, etc.

SUMMARY OF THE INVENTION

The invention provides a technology for improving the response of the oxygen concentration in the intake air to the control when the operation mode of an internal combustion engine is changed, thereby suppressing an increase in the toxic substance in the exhaust gas and unstable combustion, in an exhaust gas recirculation system that performs EGR using a high-pressure EGR unit and a low-pressure EGR unit in combination and a method for controlling the same.

A first aspect of the invention relates to an exhaust gas recirculation system for an internal combustion engine. The exhaust gas recirculation system includes a turbocharger that includes a compressor arranged in an intake passage of the internal combustion engine, and a turbine arranged in an exhaust passage of the internal combustion engine; a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor; a low-pressure EGR unit that, recirculates a portion of exhaust gas back to the internal combustion engine through a low-pressure EGR passage that provides communication between the exhaust passage, at a portion downstream of the turbine, and the intake passage, at a portion upstream of the compressor; a high-pressure EGR valve that is provided in the high-pressure EGR passage and that changes the flow passage area of the high-pressure EGR passage; a low-pressure EGR valve that is provided in the low-pressure EGR passage and that changes the flow passage area of the low-pressure EGR passage; and an EGR control unit that adjusts the opening amount of the high-pressure EGR valve to a reference high-pressure EGR valve opening amount determined based on the operation mode of the internal combustion engine, and that adjusts the opening amount of the low-pressure EGR valve to a reference low-pressure EGR valve opening amount determined based on the operation mode of the internal combustion engine.

The "reference high-pressure EGR valve opening amount" is a predetermined value of the opening amount of the high-pressure EGR valve, at which the amount of exhaust gas recirculated back to the internal combustion engine by the high-pressure EGR unit when the internal combustion engine performs the steady operation (hereinafter, referred to as the "high-pressure EGR gas") matches a predetermined reference high-pressure EGR gas amount, and which is determined based on the operation mode of the internal combustion engine. The "reference low-pressure EGR valve opening amount" is a predetermined value of the opening amount of the low-pressure EGR valve, at which the amount of exhaust gas recirculated back to the internal combustion engine by the low-pressure EGR unit when the internal combustion engine performs the steady operation (hereinafter, referred to as the "low-pressure ERG gas") matches a predetermined reference low-pressure EGR gas amount, and which is determined based on the operation mode of the internal combustion engine.

The "reference high-pressure EGR gas amount" and the "reference low-pressure EGR gas amount" are predetermined values of the high-pressure EGR gas amount and the low-pressure EGR gas amount) at which the oxygen concentration in the air taken in the internal combustion engine matches the target oxygen concentration in the intake air, at which the engine characteristics such as the amount of toxic substance in the exhaust gas, the fuel efficiency characteristics and the combustion characteristics are optimized and which is determined in advance. The "reference high-pressure EGR gas amount" and the "reference low-pressure EGR gas amount" are determined based on the operation mode of the internal combustion engine. The reference high-pressure EGR gas amount and the reference low-pressure EGR gas amount may be set to values at which the EGR rate matches the target EGR rate. The EGR rate is the proportion of the amount of exhaust gas recirculated back to the internal combustion engine by the exhaust gas recirculation system to the amount of air taken in the internal combustion engine.

If the opening amount of the high-pressure EGR valve is adjusted to the reference high-pressure EGR valve opening amount and the opening amount of the low-pressure EGR valve is adjusted to the reference low-pressure EGR valve opening amount, the high-pressure EGR gas amount is adjusted to the reference high-pressure EGR gas amount and the low-pressure EGR gas amount is adjusted to the reference low-pressure EGR gas amount. Thus, the internal combustion engine performs the steady operation under the condition in which the above-described various engine characteristics are optimized.

In the exhaust gas recirculation system according to the first aspect of the invention, in the case where the operation mode of the internal combustion engine is changed, the EGR control unit corrects the reference high-pressure EGR valve opening amount based on the characteristics of the exhaust gas present in the low-pressure EGR passage immediately before the operation mode of the internal combustion engine is changed, and maintains the opening amount of the high-pressure EGR valve at the corrected reference high-pressure EGR valve opening amount during a predetermined period after the operation mode of the internal combustion engine is changed.

Examples of the "characteristics of the exhaust gas" include the concentrations of the inert components such as carbon dioxide contained in the exhaust gas, and the temperature of exhaust gas. The "predetermined period" is a time period from when the operation mode of the internal combustion engine is changed until when the oxygen concentration in the intake air (the EGR rate), which is realized when the opening amount of the high-pressure EGR valve is adjusted to the reference high-pressure EGR valve opening amount and the opening amount of the low-pressure EGR valve is adjusted to the reference low-pressure EGR valve opening amount, matches a desired target oxygen concentration in the intake air (a desired target EGR rate). In other words, the predetermined period is a time period until when the exhaust gas that is discharged from the internal combustion engine in the pre-change operation mode and that still remains in the low-pressure EGR passage (hereinafter, referred to as the "residual low-pressure EGR gas") is entirely taken in the internal combustion engine.

According to the first aspect of the invention, the opening amount of the high-pressure EGR valve during the predetermined period is adjusted to the opening amount derived by correcting the reference high-pressure EGR valve opening amount based on the characteristics of the residual low-pressure EGR gas. The residual low-pressure EGR gas having the characteristics different from those of the exhaust gas discharged from the internal combustion engine in the post-change operation mode, and the high-pressure EGR gas which is relatively quickly changed to the exhaust gas discharged from the internal combustion engine in the post-change operation mode are recirculated back to the internal combustion engine. There is determined the high-pressure EGR valve opening amount at which the oxygen concentration in the intake air (or the EGR rate), which is realized in the above-described state, matches the target oxygen concentration in the intake air (or the target EGR rate) that is determined based on the current operation mode of the internal combustion engine.

Thus, the oxygen concentration in the intake air (or the EGR rate) is appropriately adjusted to the target oxygen concentration in the intake air (or the target EGR rate), which improves the response of the oxygen concentration in the intake air (or the EGR rate) to the control when the operation mode of the internal combustion engine is changed. As a result, it is possible to appropriately suppress an increase in the toxic substance in the exhaust gas and unstable combustion.

The first aspect of the invention may be applied to the control over the oxygen concentration in the intake air (or the EGR rate) when the fuel supply cut-off operation mode of the internal combustion engine ends. In this case, particularly desirable effect is produced.

In this case, the EGR control unit may estimate the characteristics of the residual exhaust gas present in the low-pressure EGR passage during the fuel supply cut-off operation mode based on the operation mode of the internal combustion engine immediately before the operation mode of the internal combustion engine is changed to the fuel supply cut-off operation mode.

For example, in the case where the operation mode of the internal combustion engine is changed from the steady operation mode to the fuel supply cut-off operation mode, the EGR control unit may keep the low-pressure EGR valve closed during the fuel supply cut-off operation mode from when the operation mode is changed to the fuel supply cut-off operation mode until when the fuel supply cut-off operation mode ends, correct the reference high-pressure EGR valve opening amount based on the steady operation mode, and maintain the opening amount of the high-pressure EGR valve at the corrected reference high-pressure EGR valve opening amount during the predetermined period after the fuel supply cut-off operation mode of the internal combustion engine ends.

When the operation mode of the internal combustion engine immediately before changed to the fuel supply cut-off operation mode is the steady operation mode, the characteristics of the exhaust gas, which is discharged from the internal combustion engine and which is present in the exhaust system, is substantially uniform. Accordingly, if the low-pressure EGR valve is closed when the operation mode of the internal combustion engine is changed from the steady operation mode to the filet supply cut-off operation mode, the exhaust gas that has substantially uniform characteristics remains in the entire low-pressure EGR passage.

The characteristics of the exhaust gas discharged from the internal combustion engine in the steady operation mode can be estimated based on the steady operation mode. Accordingly, when the exhaust gas recirculation is performed by the low-pressure EGR unit after the fuel supply cut-off operation mode of the internal combustion engine ends, the exhaust gas which have the characteristics that are different from those of the exhaust gas discharged from the internal combustion engine in the operation mode after the fuel supply cut-off operation mode ends but that are known due to the estimation, is recirculated back to the internal combustion engine as the low-pressure EGR gas.

The opening amount of the high-pressure EGR valve and the opening amount of the low-pressure EGR valve may be controlled based on the known characteristics of the exhaust gas so that the oxygen concentration in the intake air (or the EGR rate) matches the target oxygen concentration in the intake air (or the target EGR rate) when the low-pressure EGR gas having the known characteristics and the high-pressure EGR gas having the characteristics corresponding to the operation mode after the fuel supply cut-off operation mode ends are recirculated back to the internal combustion engine.

As a result it is possible to appropriately improve the response of the oxygen concentration in the intake air (or the EGR rate) to the control during the predetermined period after the fuel supply cut-off operation mode of the internal combustion engine ends.

On the other hand, when the operation mode of the internal combustion engine immediately before being changed to the fuel supply cut-off operation mode is the transient operation mode, the characteristics of the exhaust gas discharged from the internal combustion engine and present in the exhaust system vary depending on the position of the exhaust gas in the flow path, because the operating state of the internal combustion engine changes with time. Accordingly, even when the low-pressure EGR valve is kept closed during the fuel supply cut-off operation mode to cause the exhaust gas discharged from the internal combustion engine in the transient operation mode to remain in the low-pressure EGR passage, it is difficult to recirculate the exhaust gas having the known characteristics back to the internal combustion engine as the low-pressure EGR gas after the fuel supply cut-off operation mode ends.

Therefore, when the operation mode of the internal combustion engine is changed from the transient operation mode to the fuel supply cut-off operation mode, the low-pressure EGR valve may be kept open during the fuel supply cut-off operation mode from when the operation mode is changed to the fuel supply cut-off operation mode until when the fuel supply cut-off operation mode ends, and the opening amount of the high-pressure EGR valve may be adjusted to an opening amount that is larger than the reference high-pressure EGR valve opening amount, and kept at this opening amount during the predetermined period after the fuel supply cut-off operation mode of the internal combustion engine ends.

Thus, the exhaust gas that remains in the low-pressure EGR passage is forcibly introduced into the intake system and, instead of this exhaust gas, the newly-taken air flows into the low-pressure EGR passage during the fuel supply cut-off mode. Because the characteristics of the newly-taken air are known, the gas (i.e., the newly-taken air) having the known characteristics is recirculated back to the internal combustion engine as the low-pressure EGR gas after the fuel supply cut-off operation mode of the internal combustion engine ends.

Accordingly, the high-pressure EGR valve opening amount and the low-pressure EGR valve opening amount during the predetermined period are adjusted based on the known characteristics of the newly-taken air so that the oxygen concentration in the intake air (or the EGR rate) matches the target oxygen concentration in the intake air (or the target EGR rate) when the low-pressure EGR gas (newly-taken air) having the known characteristics and the high-pressure EGR gas having the characteristics corresponding to the operation mode after the fuel supply cut-off mode are recirculated back to the internal combustion engine. In this case, during the predetermined period, the oxygen concentration in the intake air (or the EGR rate) is brought to the target oxygen concentration in the intake air (or the target EGR rate) substantially only by the high-pressure EGR unit. As a result, it is possible to appropriately improve the response of the oxygen concentration in the intake air (or the EGR rate) to the control during the predetermined period after the fuel supply cut-off operation mode of the internal combustion engine ends.

A second aspect of the invention relates to a method for controlling an exhaust gas recirculation system for an internal combustion engine. The exhaust gas recirculation system includes a turbocharger that includes a compressor arranged in an intake passage of the internal combustion engine, and a turbine arranged ill an exhaust passage of the internal combustion engine; a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor; a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor; a high-pressure EGR valve that is provided in the high-pressure EGR passage and that changes the flow passage area of the high-pressure EGR passage, and a low-pressure EGR valve that is provided in the low-pressure EGR passage and that changes the flow passage area of the low-pressure EGR passage. According to the method, the opening amount of the high-pressure EGR valve is adjusted to a reference high-pressure EGR valve opening amount determined based on the operation mode of the internal combustion engine, and the opening amount of the low-pressure EGR valve is adjusted to a reference low-pressure EGR valve opening amount determined based on the operation mode of the internal combustion engine. In a case where the operation mode of the internal combustion engine is changed, the reference high-pressure EGR valve opening amount is corrected based on the characteristics of exhaust gas present in the low-pressure EGR passage immediately before the operation mode of the internal combustion engine is changed, and the opening amount of the high-pressure EGR valve is maintained at the corrected reference high-pressure EGR valve opening amount during a predetermined period after the operation mode of the internal combustion engine is changed.

The configurations described above may be combined with each other.

According to the aspects of the invention described above, it is possible to improve the response of the oxygen concentration in the intake air to the control when the operation mode of the internal combustion engine is changed, thereby suppressing an increase in the toxic substance in the exhaust gas and unstable combustion, in the exhaust gas recirculation system that performs EGR using the high-pressure EGR unit and the low-pressure EGR unit in combination and the method for controlling the same.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein:

FIG. 4A to FIG. 4F are time charts showing time-changes in the fuel injection amount, the EGR rate, the opening amount of a high-pressure EGR valve, the carbon dioxide concentration in the high-pressure EGR gas, the opening amount of a low-pressure EGR valve, and the carbon dioxide concentration in the low-pressure EGR gas, the time-changes being caused when the EGR control according to the embodiment of the invention is executed in the case where the operation mode of the internal combustion engine is changed from the steady operation mode to the fuel supply cut-off operation mode and then the fuel supply cut-off operation mode ends; and FIG. 5A to FIG. 5F are time charts showing time-changes in the fuel injection amount, the EGR rate, the opening amount of the high-pressure EGR valve, the carbon dioxide concentration in the high-pressure EGR gas) the opening amount of the low-pressure EGR valve, and the carbon dioxide concentration in the low-pressure EGR gas) the time-changes being caused when the EGR control according to the embodiment of the invention is executed in the case where the operation mode of the internal combustion engine is changed from the transient operation mode to the fuel supply cut-off operation mode and then the fuel supply cut-off operation mode ends.

DETAILED DESCRIPTION OF THE EMBODIMENT

Hereafter, an example embodiment of the invention will be described in detail with reference to the accompanying drawings. Unless otherwise noted, the sizes, materials, shapes, relative arrangements, etc. of the components described in the embodiment do not limit the technical scope of the invention.

Figure 1:
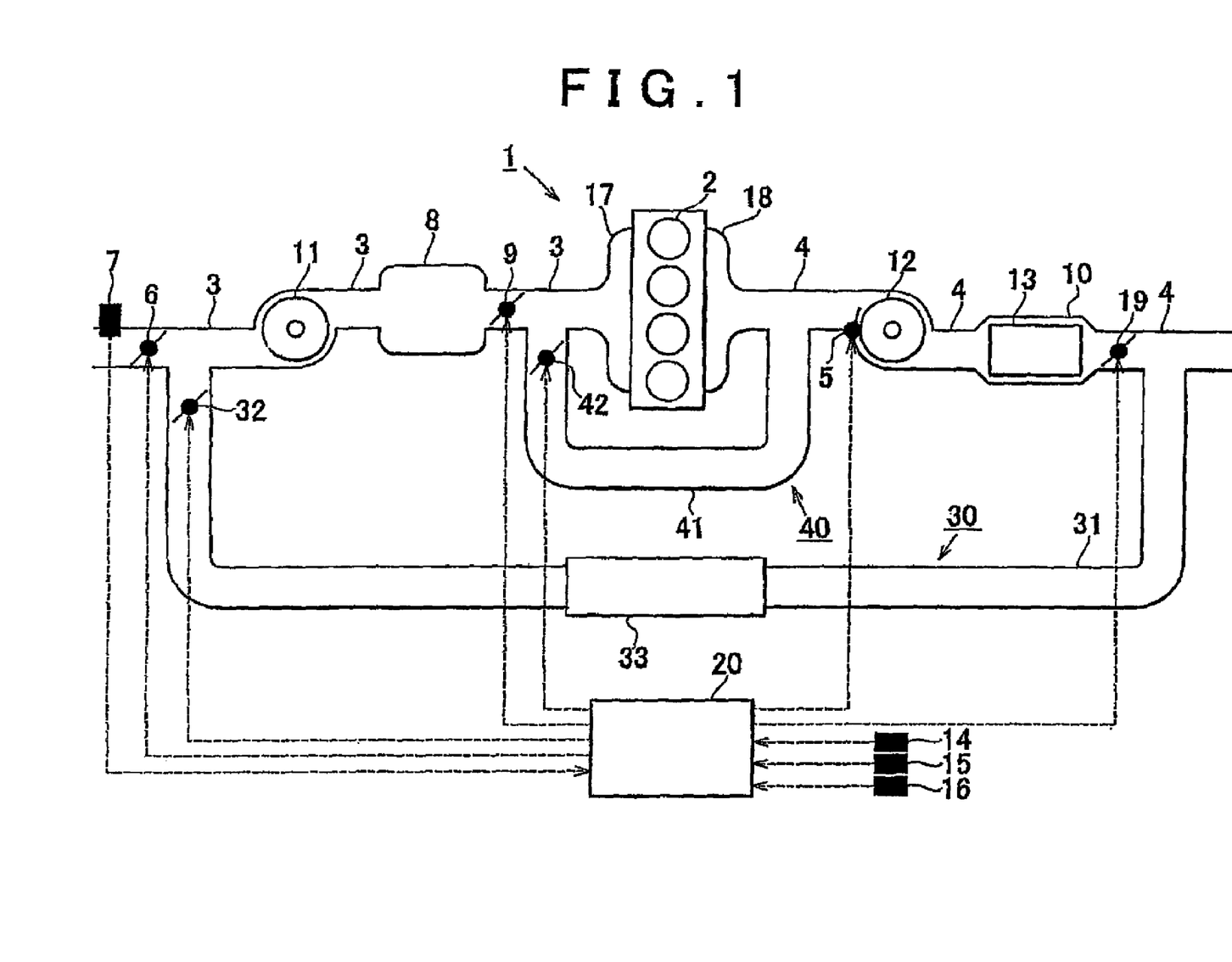
FIG. 1 is a view schematically showing the structure of an internal combustion engine and an intake system and an exhaust system of the internal combustion engine to which an EGR control according to an embodiment of the invention is applied.

FIG. 1 is a view schematically showing an intake system, an exhaust system, and a control system of an internal combustion engine provided with an exhaust gas recirculation system for an internal combustion engine according to the embodiment of the invention. An internal combustion engine 1 shown in FIG. 1 is a water-cooled four-cycle diesel engine having four cylinders 2.

An intake manifold 17 and an exhaust manifold 18 are connected to the cylinders 2 of the internal combustion engine 1. An intake pipe 3 is connected to the intake manifold 17. A second intake throttle valve 9, which regulates the flow rate of the intake air flowing through the intake pipe 3 by changing the flow passage area of the intake pipe 3, is provided in the intake pipe 3 at a position upstream of the intake manifold 17. The second intake throttle valve 9 is opened/closed by an electric actuator. An intercooler 8 that cools the intake air is provided in the intake pipe 3, at a position upstream of the second intake throttle valve 9. A compressor 11 of a turbocharger that operates using the energy of the exhaust gas as a driving source is provided in the intake pipe 3, at a position upstream of the intercooler 8. A first intake throttle valve 6, which regulates the flow rate of the intake air flowing through the intake pipe 3 by changing the flow passage area of the intake pipe 3, is provided in the intake pipe 3, at a position upstream of the compressor 11. The first intake throttle valve 6 is opened/closed by an electric actuator.

An exhaust pipe 4 is connected to the exhaust manifold 18. A turbine 12 of the turbocharger is provided in a middle portion of the exhaust pipe 4. The turbocharger is a variable capacity turbocharger provided with a nozzle vane 5 that is able to change the flow characteristics of the exhaust gas that flows into the turbine 12. An exhaust gas control apparatus 10 is provided in the exhaust pipe 4, at a position downstream of the turbine 12. The exhaust gas control apparatus 10 includes a particulate filter (hereinafter, referred to as a "filter") 13. The filter 13 supports a NOx storage reduction catalyst (hereinafter, referred to as a "NOx catalyst"). When the exhaust gas passes through the filter 13, particulate matter contained in the exhaust gas is trapped in the filter 13, and NOx contained in the exhaust gas is stored in the filter 13 if the exhaust gas is in the oxidant atmosphere. An exhaust throttle valve 19, which regulates the flow rate of the exhaust gas flowing through the exhaust pipe by changing the flow passage area of the exhaust pipe 4, is provided in the exhaust pipe 4, at a position downstream of the exhaust gas control apparatus 10. The exhaust throttle valve 19 is opened/closed by an electric actuator. In the embodiment of the invention, the exhaust throttle valve 19 is provided in the exhaust pipe 4, at a position immediately downstream of the exhaust gas control apparatus 10. Alternatively, the exhaust gas throttle valve 19 may be provided in the exhaust pipe 4, at a position downstream of the connection portion at which a low-pressure EGR passage 31, which will be described later in detail, is connected to the exhaust pipe 4. Reducing the opening amount of the exhaust throttle valve 19 makes it possible to increase the temperature of the filter 13, oxidize the particulate matter trapped in the filter 13 to remove it, and reduce the NOx stored in the NOx catalyst, The internal combustion engine 1 is provided with a low-pressure EGR unit 30 that introduces a portion of the exhaust gas, flowing through the exhaust pipe 4, to the intake pipe 3, at low pressure, to recirculate it back to the cylinders 2. The low-pressure EGR unit 30 includes the low-pressure EGR passage 31, a low-pressure EGR valve 32 and a low-pressure EGR cooler 33. The low-pressure EGR passage 31 provides communication between the exhaust pipe 4, at a portion downstream of the exhaust throttle valve 19, and the intake pipe 3, at a portion upstream of the compressor 11 and downstream of the first intake throttle valve 6. The exhaust gas is introduced to the intake pipe 3, at low pressure, through the low-pressure EGR passage 31. In the following description concerning the embodiment of the invention, the exhaust gas that is recirculated back to the cylinders 2 through the low-pressure EGR passage 31 will be referred to as the "low-pressure EGR gas".

The low-pressure EGR valve 32 is a flow-rate regulating valve that regulates the flow rate of the exhaust gas flowing through the low-pressure EGR passage 31 by changing the flow passage area of the low-pressure EGR passage 3. The flow rate of the low-pressure EGR gas is regulated by adjusting the opening amount of the low-pressure EGR valve 32. The flow rate of the low-pressure EGR gas may be regulated by a method other than adjustment of the opening amount of the low-pressure EGR valve 32. For example, the flow rate of the low-pressure EGR gas may be regulated in a method in which the pressure difference between the upstream side and the downstream side of the low-pressure EGR passage 31 is changed by adjusting the opening amount of the first intake throttle valve 6.

The low-pressure EGR cooler 33 promotes heat exchange between the low-pressure EGR gas flowing through the low-pressure EGR cooler 33 and the coolant that cools the internal combustion engine 1 to cool the low-pressure EGR gas.

The internal combustion engine 1 is provided with a high-pressure EGR unit 40 that introduces a portion of the exhaust gas flowing through the exhaust pipe 4 to the intake pipe 3, at high pressure, to recirculate it back to the cylinders 2. The high-pressure EGR unit 40 includes a high-pressure EGR passage 41, and a high-pressure EGR valve 42. The high-pressure EGR passage 41 provides communication between the exhaust pipe 4, at a portion upstream of the turbine 12, and the intake pipe 3, at a portion downstream of the second intake throttle valve 9. The exhaust gas is introduced to the intake pipe 3, at high pressure, through the high-pressure EGR passage 41. In the following description concerning the embodiment of the invention the exhaust gas that is recirculated back to the cylinders 2 through the high-pressure EGR passage 41 will be referred to as the "high-pressure EGR gas".

The high-pressure EGR valve 42 is a flow-rate regulating valve that regulates the flow rate of the exhaust gas flowing through the high-pressure EGR passage 41 by changing the flow passage area of the high-pressure EGR passage 41. The flow rate of the high-pressure EGR gas is regulated by adjusting the opening amount of high-pressure EGR valve 42. The flow rate of the high-pressure EGR gas may be regulated by a method other than adjustment of the opening amount of high-pressure EGR valve 42. For example, the flow rate of the high-pressure EGR gas may be regulated in a method in which the pressure difference between the upstream side and the downstream side of the high-pressure EGR passage 41 is changed by adjusting the opening amount of the second intake throttle valve 9. The flow rate of the high-pressure EGR gas may be regulated by adjusting the opening amount of the nozzle vane 5.

The internal combustion engine 1 is provided with an electronic control unit (ECU) 20 that controls the internal combustion engine 1. The ECU 20 is a microcomputer that has a known structure in which read only memory (ROM), random access memory (RAM), a central processing unit (CPU), an input port, an output port, a digital-analog converter (DA converter), an analog-digital converter (AD converter), etc. are connected to each other via a bi-directional bus.

The ECU 20 executes various known basic controls for a diesel engine, such as the fuel injection control, based on the operation mode of the internal combustion engine 1 and an instruction from a driver. Therefore, the internal combustion engine 1 in the embodiment of the invention is provided with an airflow meter 7 that detects the flow rate of the newly-taken air flowing through the intake pipe 3, a coolant temperature sensor 14 that detects the temperature of the coolant in the internal combustion engine 1, an accelerator angle sensor 15 that detects the amount by which the accelerator pedal is depressed by the driver (accelerator angle), a crank position sensor 16 that detects the rotational phase (crank angle) of the crankshaft of the internal combustion engine 1, and various sensors (not shown) that are usually provided to a diesel engine.

These sensors are connected to the ECU 20 via electric wiring, and signals output from these sensors are transmitted to the ECU 20. Devices such as drive units that drive the first intake throttle valve 6, the second intake throttle valve 9, the exhaust throttle valve 19, the low-pressure EGR valve 32, and the high-pressure EGR valve 42 are connected to the ECU 20 via electric wiring. These devices are controlled according to control signals transmitted from the ECU 20.

The ECU 20 determines the operation mode of the internal combustion engine 1 and the instruction from the driver based on the values detected by these sensors. For example, the ECU 20 detects the operation mode of the internal combustion engine 1 based on the engine speed, which is determined based on the crank angle indicated by a signal from the crank position sensor 16, and the engine load, which is determined based on the accelerator angle indicated by a signal from the accelerator angle sensor 15. Then, the ECU 20 controls the low-pressure EGR valve 32, the high-pressure EGR valve 42, etc, based on the detected engine operation mode and instruction from the driver, thereby controlling the EGR gas amount, the intake air amount, etc.

Next, the EGR control executed by the ECU 20 will be described.

In the exhaust gas recirculation system according to the embodiment of the invention, the target value of the EGR rate (hereinafter, referred to as the "target EGR rate") is set for each operation mode of the internal combustion engine 1 so that the NOx discharge amount matches a predetermined target value. Then, the target EGR rate is achieved by performing EGR using the high-pressure EGR unit 40 and the low-pressure EGR unit 30 in combination, and the combination of the high-pressure EGR gas amount and the low-pressure EGR gas amount (or the proportion of each of the high-pressure EGR gas amount and the low-pressure EGR gas amount to the entire EGR gas amount), which is optimum for achieving the predetermined engine characteristics such as the fuel consumption amount and the combustion characteristics due to performance of EGR, is obtained, and the high-pressure EGR gas amount and the low-pressure EGR gas amount in this optimum combination are stored in the ROM of the ECU 20 as the reference high-pressure EGR gas amount and the reference low-pressure EGR gas amount. The EGR rate is the proportion of the entire EGR gas amount (the sum of the high-pressure EGR gas amount and the low-pressure EGR gas amount) to the intake air amount. When the intake air amount is denoted by Gcyl and the amount of newly-taken air detected by the airflow meter 7 is denoted by Gn, the EGR rate is expressed by the equation, EGR rate=(Gcyl−Gn)/Gcyl.

Then, the opening amount of the low-pressure EGR valve 32, at which the low-pressure EGR gas amount matches the reference low-pressure EGR gas amount when the internal combustion engine 1 performs the steady operation, is determined and used as the reference low-pressure EGR valve opening amount. The opening amount of the high-pressure EGR valve 42, at which the high-pressure EGR gas amount matches the reference high-pressure EGR gas amount when the internal combustion engine 1 performs the steady operation, is determined and used as the reference high-pressure EGR valve opening amount. The reference low-pressure EGR valve opening amount and the reference high-pressure EGR valve opening amount are stored in the ROM of the ECU 20.

The ECU 20 reads the reference low-pressure EGR valve opening amount and the reference high-pressure EGR valve opening amount from the ROM based on the operation mode of the internal combustion engine 1. The ECU 20 controls the low-pressure EGR valve 32 so that the opening amount of the low-pressure EGR valve 32 matches the reference low-pressure EGR valve opening amount. The ECU 20 also controls the high-pressure EGR valve 42 so that the opening amount of the high-pressure EGR valve 42 matches the reference high-pressure EGR valve opening amount.

Figure 2:
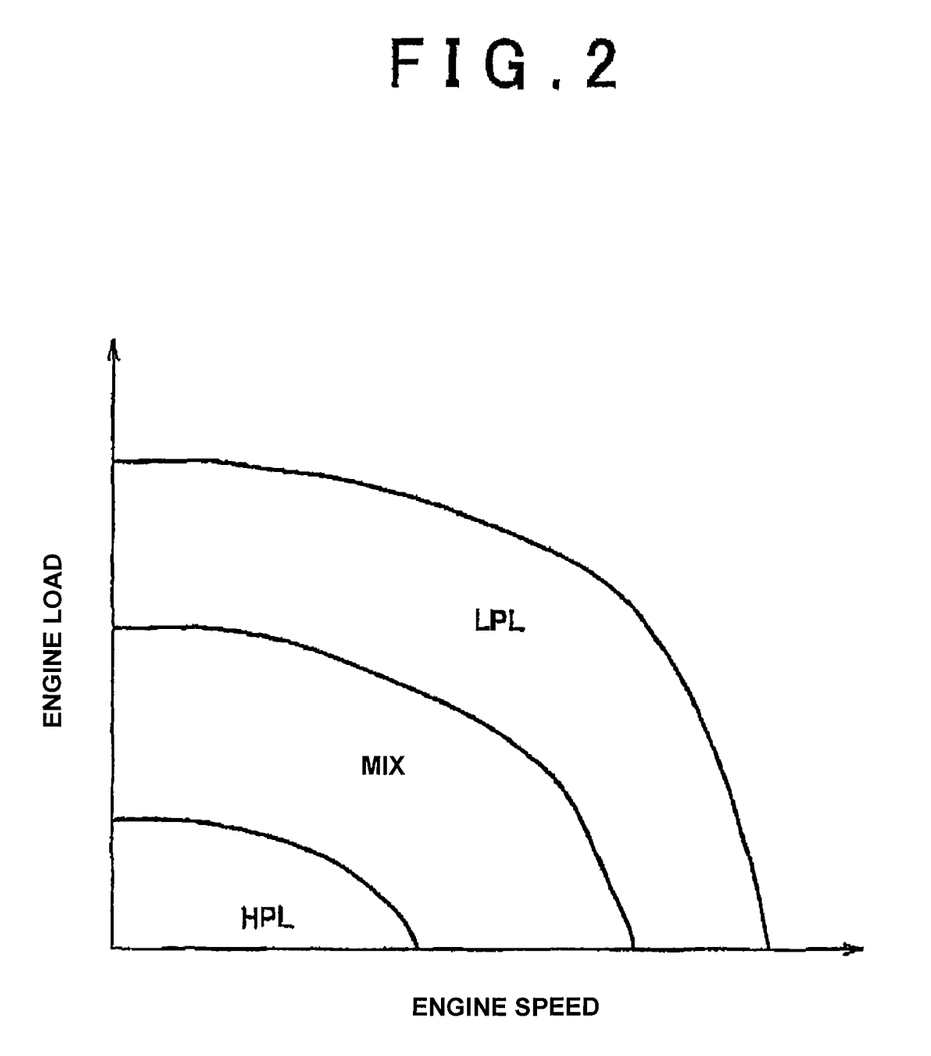
FIG. 2 is a graph showing the manner in which the EGR unit used for EGR is selected from among a high-pressure EGR unit and a low-pressure EGR unit according to the embodiment of the invention.

FIG. 2 is a graph showing the manner in which the EGR unit used for EGR is selected from among the high-pressure EGR unit 40 and the low-pressure EGR unit 30, which is set for each operating range of the internal combustion engine 1. In FIG. 2, the lateral axis of the graph represents the rotational speed of the internal combustion engine 1, and the vertical axis of the graph represents the load placed on the internal combustion engine 1. As shown in FIG. 2, when the internal combustion engine 1 is operating at low load, EGR is performed using only the high-pressure EGR unit 40. This operating range in which only the high-pressure EGR unit 40 is used is referred to as the range HPL. When the internal combustion engine 1 is operating at medium load, EGR is performed using the high-pressure EGR unit 40 and the low-pressure EGR unit 30 in combination. This operating range in which the high-pressure EGR unit 40 and the low-pressure EGR unit 30 are used in combination is referred to as the range MIX. When the internal combustion engine 1 is operating at high load, EGR is performed using only the low-pressure EGR unit 30. This operating range in which only the low-pressure EGR unit 30 is used is referred to as the range LPL. In the operating range that is higher in the engine load than the upper limit of the range LPL, EGR is not performed.

Performing EGR by using the EGR unit selected from among the low-pressure EGR unit 40 and the high-pressure EGR unit 30 or using the low-pressure EGR unit 40 and the high-pressure EGR unit 30 in combination based on the operation mode of the internal combustion engine 1 makes it possible to perform EGR in a broader operating range of the internal combustion engine 1. As a result, the NOx generation amount is reduced.

The high-pressure EGR gas is recirculated back to the internal combustion engine 1 through the high-pressure EGR passage 31 that connects a portion near the exhaust manifold 19 to a portion near the intake manifold 17. Because the high-pressure EGR passage 41 is relatively short, the high-pressure EGR gas amount quickly responds to a change in the opening amount of the high-pressure EGR valve 42. When the operation mode of the internal combustion engine 1 is changed from an operation mode (a first operation mode) to another operation mode (a second operation mode), the high-pressure EGR gas in the high-pressure EGR gas passage 41 is changed within a relatively short time from the exhaust gas discharged from the internal combustion engine 1 in the first operation mode to the exhaust gas discharged from the internal combustion engine 1 in the second operation mode.

On the other hand, in the path through which the low-pressure EGR gas flows, there are arranged the long low-pressure EGR passage 31, the low-pressure EGR cooler 33 and the intercooler 8 that have large flow passage volumes, etc. Accordingly, the response of low-pressure EGR gas amount to a change in the opening amount of the low-pressure EGR valve 32 is slow. When the operation mode of the internal combustion engine 1 is changed from the first operation mode to the second operation mode, there is a large amount of low-pressure EGR gas that is discharged from the internal combustion engine 1 in the first operation mode, flows in the low-pressure EGR passage 31 and still remains in the low-pressure EGR passage 31 without flowing in the intake pipe 3 (hereinafter, such low-pressure EGR, gas will be referred to as the "residual low-pressure EGR gas"). Accordingly, a relatively long time period (hereinafter, referred to as the "low-pressure EGR gas changing period") is required until the residual low-pressure EGR gas is entirely recirculated back to the internal combustion engine 1 and the exhaust gas discharged from the internal combustion engine 1 in the second operation mode starts to be recirculated back to the internal combustion engine 1 as the low-pressure EGR gas.

The residual low-pressure EGR gas that is recirculated back to the internal combustion engine 1 during the low-pressure EGR gas changing period differs in the concentrations of the exhaust gas components from the exhaust gas discharged from the internal combustion engine 1 in the second operation mode. Accordingly, even when the opening amount of the low-pressure EGR valve 32 is adjusted to the reference low-pressure EGR valve opening amount corresponding to the second operation mode when the operation mode of the internal combustion engine 1 is changed from the first operation mode to the second operation mode, the influence of the low-pressure EGR gas amount on the EGR rate may be excessively larger or smaller than expected. In this case, the EGR rate during the low-pressure EGR gas changing period does not match the target EGR rate corresponding to the second operation mode, resulting in an increase in the NOx discharge amount and unstable combustion.

Therefore, the exhaust gas recirculation system according to the embodiment of the invention changes the opening amount of the high-pressure EGR valve 42 from the reference high-pressure EGR valve opening amount to an appropriate opening amount, and maintains the appropriate opening amount during the low-pressure EGR gas changing period when the operation mode of the internal combustion engine 1 is changed from the first operation mode to the second operation mode. Thus, the deviation in the EGR rate from the target EGR rate due to the recirculation of the residual low-pressure EGR gas back to the internal combustion engine 1 is corrected.

More specifically, the concentrations of the components of the residual low-pressure EGR gas (the carbon dioxide concentration, the oxygen concentration, etc.) are estimated based on the operation parameters (engine speed, engine load, etc.) related to the first operation mode. During the low-pressure EGR gas changing period, the residual low-pressure EGR gas containing the components having the estimated concentrations is recirculated back to the internal combustion engine 1 by the low-pressure EGR unit 30 and the exhaust gas discharged from the internal combustion engine 1 in the second operation mode is recirculated back to the internal combustion engine 1 by the high-pressure EGR unit 40. There is determined the high-pressure EGR valve opening amount at which the EGR rate, which is realized in the above-described state, matches the target EGR rate corresponding to the second operation mode.

Thus, the target EGR rate during the low-pressure EGR gas changing period is appropriately adjusted to the target EGR rate. Accordingly, it is possible to suppress an increase in the NOx discharge amount and unstable combustion immediately after the operation mode of the internal combustion engine 1 is changed.

Figure 3:
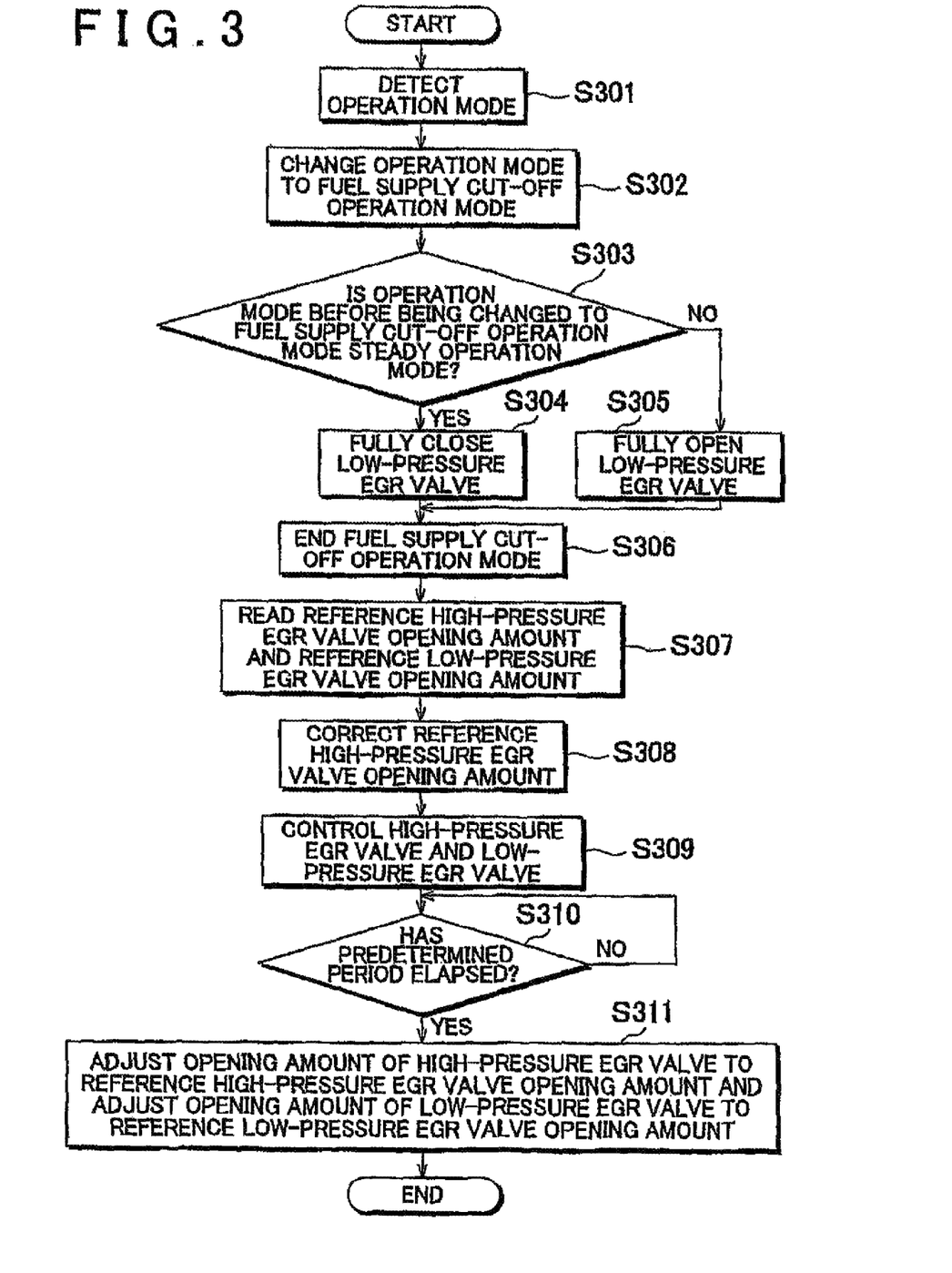
FIG. 3 is a flowchart showing the EGR control routine according to the embodiment of the invention.

Hereafter, the embodiment in which the EGR control described above is executed when the fuel supply cut-off operation mode (no-load operation mode) of the internal combustion engine 1 ends will be described with reference to FIG. 3. FIG. 3 is a flowchart showing the EGR control routine executed when the fuel supply cut-off operation mode of the internal combustion engine 1 ends. The routine is a computer program stored in advance in the ROM of the ECU 20, and is executed at predetermined time intervals when the internal combustion engine 1 is being operated.

When the EGR control routine is started, the ECU 20 first detects the operation mode of the internal combustion engine 1 (step S301). More specifically, the ECU 20 determines the engine speed based on the crank angle detected by the crank position sensor 16, and engine load based on the accelerator angle detected by the accelerator angle sensor 15.

When the operation mode of the internal combustion engine 1 detected in step S301 is the operation mode that belongs to the operating range in which the fuel supply cut-off operation should be performed the ECU 20 changes the operation mode of the internal combustion engine 1 to the fuel supply cut-off operation mode (step S302).

Then, the ECU 20 determines whether the operation mode of the internal combustion engine 1 immediately before being changed to the fuel supply cut-off operation mode is the steady operation mode (step S303).

When an affirmative determination is made in step S303, the ECU 20 fully closes the low-pressure EGR valve 32 (step S304). Namely, when the internal combustion engine 1 performs the steady operation immediately before the operation mode thereof is changed to the fuel supply cut-off operation mode) the low-pressure EGR valve 32 is closed at the same time that the operation mode of the internal combustion engine 1 is changed to the fuel supply cut-off operation mode. Thus, the exhaust gas that is discharged from the internal combustion engine 1 in the steady operation mode and that has uniform characteristics remains as the residual low-pressure EGR gas in the low-pressure EGR passage 31.

On the other hand, when a negative determination is made in step S303, the ECU 20 fully opens the low-pressure EGR valve 32 (step S305). Namely, when the internal combustion engine 1 performs the transient operation immediately before the operation mode of the internal combustion engine 1 is changed to the fuel supply cut-off operation mode, the ECU 20 opens the low-pressure EGR valve 32 at the same time that the operation mode of the internal combustion engine 1 is changed to the fuel supply cut-off operation mode. At this time, the first intake throttle valve 6 and the second intake throttle valve 9 are opened. Thus, the exhaust gas, which has a non-uniform and unknown carbon dioxide concentration and which is discharged from the internal combustion engine 1 in the transient operation mode and remains in the low-pressure EGR passage 31, is forced out of the low-pressure EGR passage 31 by the air that is taken in during the fuel supply cut-off operation mode and that flows through the intake and exhaust systems. Thus, the air that is taken in during the fuel supply cut-off operation mode and that has uniform characteristics remains as the residual low-pressure EGR gas in the low-pressure EGR passage 31.

When the condition for ending the fuel supply cut-off operation mode of the internal combustion engine 1 is satisfied, the ECU 20 resumes fuel injection to end the fuel supply cut-off operation mode of the internal combustion engine 1 (step S306). The ECU 20 reads the reference high-pressure EGR valve opening amount and the reference low-pressure EGR valve opening amount from the ROM based on the operation mode to which the operation mode of the internal combustion engine 1 is changed from the fuel supply cut-off operation mode (step S307).

Then, the ECU 20 corrects the reference high-pressure EGR valve opening amount read in step S307 so that the EGR rate matches the target EGR rate corresponding to the operation mode to which the operation mode of the internal combustion engine 1 is changed from the fuel supply cut-off operation mode (step S308).

More specifically, when the operation mode of the internal combustion engine 1 immediately before being changed to the fuel supply cut-off operation mode is the steady operation mode, the carbon dioxide concentration in the residual low-pressure EGR gas (in this case, the exhaust gas discharged during the steady operation mode) based on the operation parameters (engine speed, engine load, etc.) related to the steady operation mode. During the low-pressure EGR gas changing period, the residual low-pressure EGR gas having the estimated carbon dioxide concentration is recirculated back to the internal combustion engine 1 by the low-pressure EGR unit 30, and the exhaust gas discharged from the internal combustion engine 1 in the operation mode, to which the operation mode of the internal combustion engine 1 is changed from the fuel supply cut-off operation mode, is recirculated back to the internal combustion engine 1 by the high-pressure EGR unit 40. The reference high-pressure EGR valve opening amount is corrected so that the EGR rate, which is realized in the above-described state, matches the target EGR rate corresponding to the operation mode to which the operation mode of the internal combustion engine 1 is changed from the fuel supply cut-off operation mode.

When the operation mode of the internal combustion engine 1 immediately before being changed to the fuel supply cut-off operation mode is the transient operation mode, the carbon dioxide concentration (or the oxygen concentration) in the air taken in during the fuel supply cut-off operation mode is detected or estimated. During the low-pressure EGR gas changing period, the air taken in during the fuel supply cut-off operation mode is recirculated back to the internal combustion engine 1 by the low-pressure EGR unit 30, and the exhaust gas discharged from the internal combustion engine in the operation mode, to which the operation mode of the internal combustion engine 1 is changed from the fuel supply cut-off operation mode, is recirculated back to the internal combustion engine 1 by the high-pressure EGR unit 40. The reference high-pressure EGR valve opening amount is corrected such that the EGR rate, which is realized in the above-described state, matches the target EGR rate corresponding to the operation mode to which the operation mode of the internal combustion engine 1 is changed from the fuel supply cut-off operation mode. In this case, the opening amount of the high-pressure EGR valve 42, at which the target EGR rate is achieved only by the high-pressure EGR gas, is determined.

Then, the ECU 20 adjusts the opening amount of the low-pressure EGR valve 32 to the reference low-pressure EGR valve opening amount read in step S307, and adjusts opening amount of the high-pressure EGR valve 42 to the high-pressure EGR valve opening amount determined in step S308 (step S309).

The ECU 20 maintains the state, which is realized by executing step S309 and in which the high-pressure EGR valve 42 is open by the reference high-pressure EGR valve opening amount and the low-pressure EGR valve 32 is open by the reference low-pressure EGR valve opening amount, during the low-pressure EGR gas changing period. In this case, the low-pressure EGR gas changing period is determined based on the flow rate of the low-pressure EGR gas in the operation mode to which the operation mode of the internal combustion engine 1 is changed from the fuel supply cut-off operation mode and the volume, shape, etc. of the low-pressure EGR passage 31.

When the low-pressure EGR gas changing period has elapsed since the fuel supply cut-off operation mode of the internal combustion engine 1 ends (step S310), the ECU 20 adjusts opening amount of the high pressure EGR valve 42 to the reference high-pressure EGR valve opening amount and adjusts the opening amount of the low-pressure EGR valve 32 to the reference low-pressure EGR valve opening amount (step S311).

If the ECU 20 executes the EGR control routine, the EGR rate during the low-pressure EGR gas changing period after the fuel supply cut-off operation mode of the internal combustion engine 1 ends is adjusted to the target EGR rate corresponding to the operation mode to which the operation mode of the internal combustion engine 1 is changed from the fuel supply cut-off operation mode. As a result, it is possible to appropriately suppress an increase in the NOx discharge amount and unstable combustion during the low-pressure EGR gas changing period.

FIG. 4A to FIG. 4F are time charts showing time-changes in the fuel injection amount, the EGR rate, the opening amount of the high-pressure EGR valve, the carbon dioxide concentration in the high-pressure EGR gas, the opening amount of the low-pressure EGR valve, and the carbon dioxide concentration in the low-pressure EGR gas, the time-changes being caused when the EGR control routine is executed in the case where the operation mode of the internal combustion engine is changed from the steady operation mode (hereinafter, referred to as the "first operation mode") to the fuel supply cut-off operation mode and then the fuel supply cut-off operation mode of the internal combustion engine 1 ends. Hereinafter, the operation mode to which the operation mode of the internal combustion engine 1 is changed from the fuel supply cut-off operation mode will be referred to as the "second operation mode".

Figure 4A:
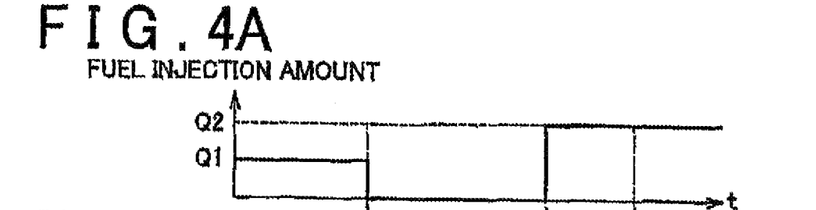
Figure 4B:
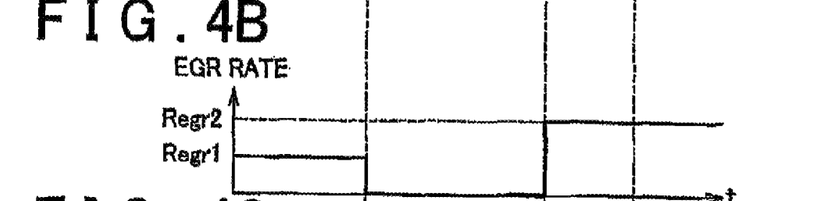
Figure 4C:
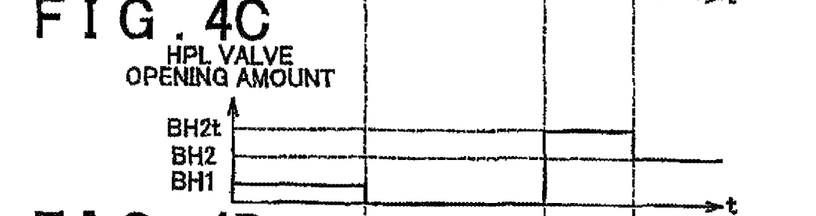
Figure 4D:
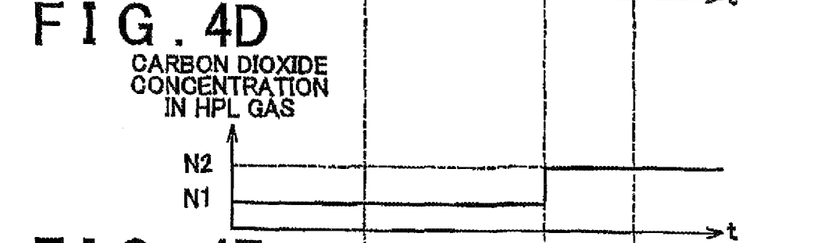
Figure 4E:
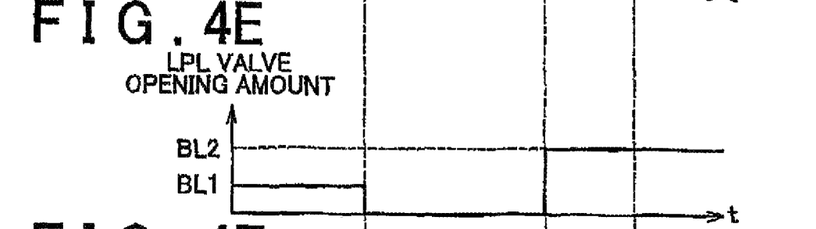
Figure 4F:
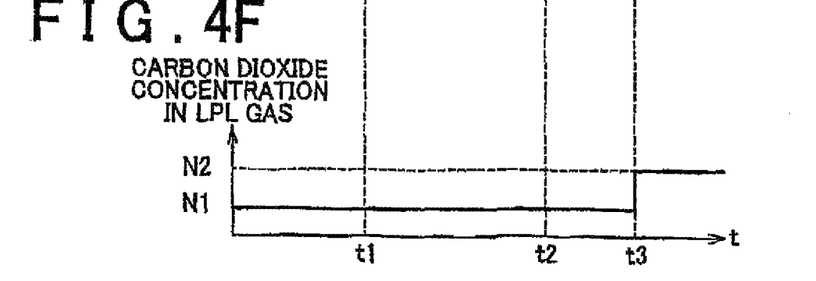

As shown in FIG. 4A, when the internal combustion engine 1 is in the first operation mode (before time t1), the fuel injection amount is Q1 and substantially constant, the target EGR rate corresponding to the first operation mode is Regr1 (FIG. 4B), the reference high-pressure EGR valve opening amount corresponding to the first operation mode is BH1 (FIG. 4C), and the reference low-pressure EGR valve opening amount corresponding to the first operation mode is BL1 (FIG. 4E), and the internal combustion engine 1 is performing the steady operation. At time t1, the internal combustion engine 1 is brought into the no-load operation mode, the fuel injection amount is adjusted to zero, and the operation mode of the internal combustion engine 1 is changed to the fuel supply cut-off operation mode At time t1, the high-pressure EGR valve and the low-pressure EGR valve are both fully closed, as shown in FIGS. 4C and 4F. Thus, as shown in FIGS. 4D and 4F, the carbon dioxide concentration in the high-pressure EGR gas and the carbon dioxide concentration in the low-pressure EGR gas are maintained at the carbon dioxide concentration (N1) in the exhaust gas discharged from the internal combustion engine 1 in the first operation mode.

At time t2, the condition for ending the fuel supply cut-off operation mode of the internal combustion engine 1 is satisfied, the operation mode of the internal combustion engine 1 is changed to the second operation mode, and fuel starts to be injected in the fuel injection amount Q2. When the opening amount of the high-pressure EGR valve 42 and the opening amount of the low-pressure EGR valve 32 are adjusted to the reference high-pressure EGR valve opening amount BH2 and the reference low-pressure EGR valve opening amount BL2, both of which correspond to the second operation mode, respectively, at time t2, the carbon dioxide concentration in the high-pressure EGR gas quickly changes to the carbon dioxide concentration N2 in the exhaust gas discharged from the internal combustion engine 1 in the second operation mode, as shown in FIG. 4D. In contrast, the carbon dioxide concentration in the low-pressure EGR gas remains at the carbon dioxide concentration in the residual low-pressure EGR gas, namely, the carbon dioxide concentration N1 in the exhaust gas discharged from the internal combustion engine 1 in the first operation mode, until the residual low-pressure EGR gas is entirely recirculated back to the internal combustion engine 1 (until time t3).

Accordingly, even when the opening amount of the high-pressure EGR valve 42 and the opening amount of the low-pressure EGR valve 32 are adjusted to the reference high-pressure EGR valve opening amount BH2 and the reference low-pressure EGR valve opening amount BL2, both of which correspond to the second operation mode, respectively, when the fuel supply cut-off operation mode of the internal combustion engine 1 ends (at time t2), the EGR rate does not reach the target EGR rate Regr2 corresponding to the second operation mode.

In contrast, with the EGR control described above, as shown in FIG. 4C, the opening amount of the high-pressure EGR valve 42 is corrected, at time t2, to the opening amount BH2$t$ that is larger than the reference high-pressure EGR valve opening amount BH2 corresponding to the second operation mode, and the opening amount BH2$t$ is maintained during the low-pressure EGR gas changing period from time t2 to time t3. The correction amount is determined based on the carbon dioxide concentration N1 in the exhaust gas discharged from the internal combustion engine 1 in the first operation mode, which can be estimated based on the operation parameters (engine speed, engine load, etc.) related to the first operation mode that is the steady operation mode. The correction amount is determined according to a predetermined model calculation or a map.

Thus, a shortfall in the EGR rate is covered. The shortfall is due to the fact that, during the low-pressure EGR gas changing period, the carbon dioxide concentration in the low-pressure EGR gas is lower than the carbon dioxide concentration N2 in the exhaust gas discharged from the internal combustion engine 1 in the second operation mode. As shown in FIG. 4B, the EGR rate is appropriately maintained at the target EGR rate Regr2 corresponding to the second operation mode even during the low-pressure EGR gas changing period.

The low-pressure EGR gas changing period $\Delta t(=t3-t2)$ may be determined based on the volume of the low-pressure EGR gas passage 31 and the flow rate of the low-pressure EGR gas.

FIG. 5A to FIG. 5F are time charts showing time-changes in the fuel injection amount, the EGR rate, the opening amount of the high-pressure EGR valve, the carbon dioxide concentration in the high-pressure EGR gas, the opening amount of the low-pressure EGR valve, and the carbon dioxide concentration in the low-pressure EGR gas, the time-changes being caused when the EGR control routine is executed in the case where the operation mode of the internal combustion engine 1 is changed from the transient operation mode (hereinafter, referred to as the "first operation mode") to the fuel supply cut-off operation mode and then the fuel supply cut-off operation mode of the internal combustion engine 1 ends. Hereafter, the operation mode to which the operation mode of the internal combustion engine 1 is changed from the fuel supply cut-off operation mode will be referred to as the second operation mode.

Figure 5A:
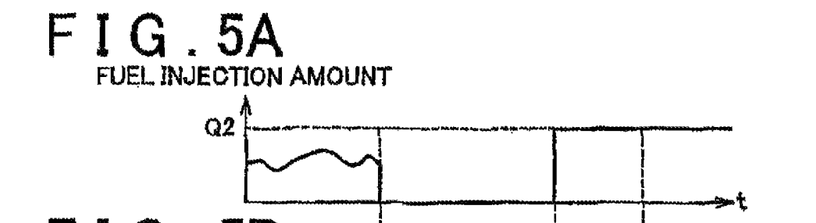

As shown in FIG. 5A, when the internal combustion engine 1 is in the first operation mode (before time t1), the internal combustion engine 1 is in the transient operation mode. Accordingly, during the first operation mode, the fuel injection amount changes with time. At time t1, the internal combustion engine 1 is brought into the no-load operation mode, the fuel injection amount is adjusted to zero, and the operation mode of the internal combustion engine 1 is changed to the fuel supply cut-off operation mode.

Figure 5B:
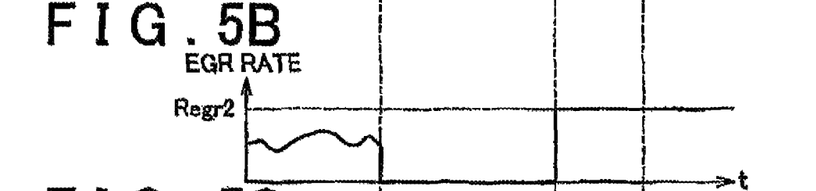
Figure 5C:
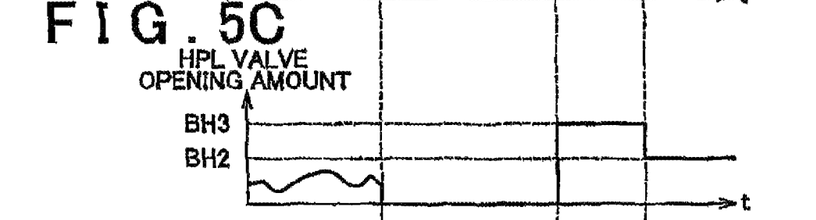
Figure 5D:
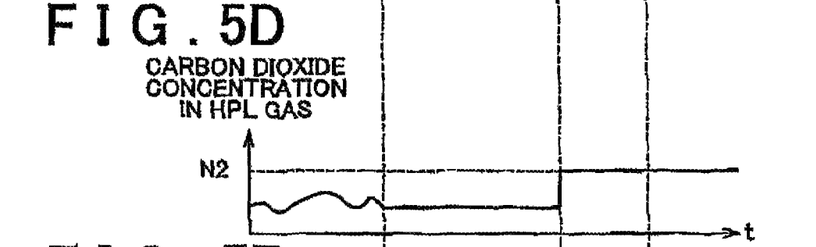
Figure 5E:
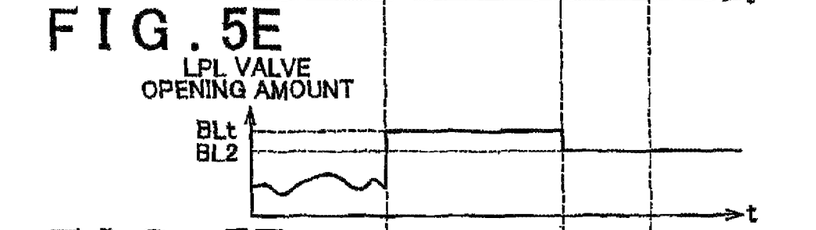
Figure 5F:
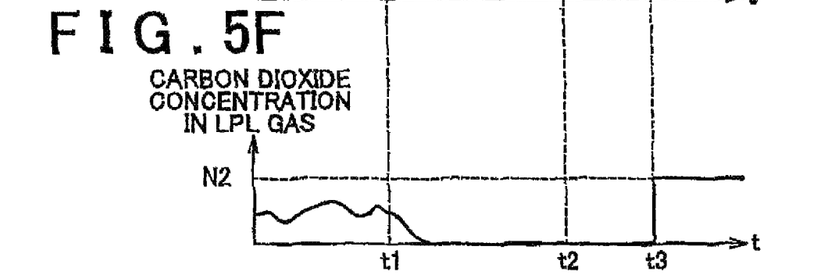

At time t1, the high-pressure EGR valve is fully closed, as shown in FIG. 5C. Thus, as shown in FIG. 5D, the carbon dioxide concentration in the high-pressure EGR gas is maintained at the carbon dioxide concentration in the exhaust gas discharged from the internal combustion engine 1 when the operation mode of the internal combustion engine 1 is changed from the first operation mode to the fuel supply cut-off operation mode. The low-pressure EGR valve is fully opened (BLt) at time t1, as shown in FIG. 5E. Thus, the air, which is taken in during the fuel supply cut-off operation mode and flows through the intake pipe 3 and the exhaust pipe 4 (without undergoing combustion), flows into the low-pressure EGR passage 31, and forces the exhaust gas that remains in the low-pressure EGR passage 31 during the first operation mode out of the low-pressure EGR passage 31. Therefore, as shown in FIG. 5F, the carbon dioxide concentration in the low-pressure EGR gas becomes substantially equal to the carbon dioxide concentration in the intake air. Thus, the air that is the gas having a known carbon dioxide concentration remains in the low-pressure EGR passage 31 instead of the exhaust gas which is discharged from the internal combustion engine 1 during the transient operation mode and which has a carbon dioxide concentration that is hard to estimate.

At time t2, the condition for ending the fuel supply cut-off operation mode of the internal combustion engine 1 is satisfied, the operation mode of the internal combustion engine 1 is changed to the second operation mode, and the fuel starts to be injected in the fuel injection amount Q2. When the opening amount of the high pressure EGR valve 42 and the opening amount of the low-pressure EGR valve 32 are adjusted, at time t2, to the reference high-pressure EGR valve opening amount BH2 and the reference low-pressure EGR valve opening amount BL2, both of which correspond to the second operation mode, respectively, the carbon dioxide concentration in the high-pressure EGR gas quickly changes to the carbon dioxide concentration N2 in the exhaust gas discharged from the internal combustion engine 1 in the second operation mode, as shown in FIG. 5D. In contrast, as shown in FIG. 5F, the carbon dioxide concentration in the low-pressure EGR gas remains at the carbon dioxide concentration in the residual low-pressure EGR gas, namely, the carbon dioxide concentration in the air (substantially equal to zero), until the residual low-pressure EGR gas (the air, in this case) is entirely recirculated back to the internal combustion engine 1 (until t3).

Therefore, even when the opening amount of the high-pressure EGR valve 42 and the opening amount of the low-pressure EGR valve 32 are adjusted to the reference high-pressure EGR valve opening amount BH2 and the reference low-pressure EGR valve opening amount BL2, both of which correspond to the second operation mode, respectively, when the fuel supply cut-off operation mode of the internal combustion engine 1 ends (at time t2), the EGR rate does not reach the target EGR rate Regr2 corresponding to the second operation mode.

In contrast, with the EGR control described above, the opening amount of the high-pressure EGR valve 42 is corrected, at time t2, to the opening amount BH3 that is larger than the reference high-pressure EGR valve opening amount BH2 corresponding to the second operation mode, and maintained at the opening amount BH3 during the low-pressure EGR gas changing period from time t2 to time t3. The correction amount is determined such that the target EGR rate Regr2 corresponding to the second operation mode can be achieved only by the high-pressure EGR gas by adjusting the opening amount of the high-pressure EGR valve 42 to the corrected opening amount BH3. Because the residual low-pressure EGR gas is changed from the exhaust gas which is discharged from the internal combustion engine 1 in the transient operation mode and which has an unknown carbon dioxide concentration to the air having a known carbon dioxide concentration, it is possible to easily and accurately determine the corrected opening amount BH3.

Thus, as shown in FIG. 5B even during the low-pressure EGR gas changing period, the EGR rate is appropriately maintained at the target EGR rate Regr2 corresponding to the second operation mode.

The low-pressure EGR gas changing period Δt (=t3−t2) may be determined based on the volume of the low-pressure EGR passage 31 and the flow rate of the low-pressure EGR gas.

While the invention has been described with reference to an example embodiment thereof, it is to be understood that the invention is not limited to the example embodiment. To the contrary, the invention is intended to cover various modifications and equivalent arrangements within the scope of the invention.

The invention claimed is:

1. A method for controlling an exhaust gas recirculation system for an internal combustion engine, the exhaust gas recirculation system including:
 a turbocharger that includes a compressor arranged in an intake passage of the internal combustion engine, and a turbine arranged in an exhaust passage of the internal combustion engine;
 a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
 a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
 a high-pressure EGR valve that is provided in the high-pressure EGR passage and that changes a flow passage area of the high-pressure EGR passage;
 a low-pressure EGR valve that is provided in the low-pressure EGR passage and that changes a flow passage area of the low-pressure EGR passage; and
 a control unit,
the method comprising:
 adjusting an opening amount of the high-pressure EGR valve to a reference high-pressure EGR valve opening amount determined based on an operation mode of the internal combustion engine, and adjusting an opening amount of the low-pressure EGR valve to a reference low-pressure EGR valve opening amount determined based on the operation mode of the internal combustion engine; and
 correcting the reference high-pressure EGR valve opening amount based on characteristics of exhaust gas present in the low-pressure EGR passage immediately before the operation mode of the internal combustion engine is changed to a mode where a fuel supply cut-off operation mode of the internal combustion engine ends, and maintaining the opening amount of the high-pressure EGR valve at the corrected reference high-pressure EGR valve opening amount during a predetermined period after the operation mode of the internal combustion engine is changed, in a case where the operation mode of the internal combustion engine is changed.

2. The method according to claim 1, wherein
the characteristics of exhaust gas present in the low-pressure EGR passage during the fuel supply cut-off operation mode are estimated based on the operation mode of the internal combustion engine immediately before the operation mode of the internal combustion engine is changed to the fuel supply cut-off operation mode.

3. The method according to claim 1, wherein,
in a case where the operation mode of the internal combustion engine is changed from a steady operation mode to the fuel supply cut-off operation mode, the low-pressure EGR valve is kept closed during the fuel supply cut-off operation mode, the reference high-pressure EGR valve opening amount is corrected based on the steady operation mode, and the opening amount of the high-pressure EGR valve is maintained at the corrected reference high-pressure EGR valve opening amount during the predetermined period after the fuel supply cut-off operation mode of the internal combustion engine ends.

4. The method according to claim 1, wherein,
in a case where the operation mode of the internal combustion engine is changed from a transient operation mode to the fuel supply cut-off operation mode, the low-pressure EGR valve is kept open during the fuel supply cut-off operation mode, and the opening amount of the high-pressure EGR valve is maintained at an opening amount that is larger than the reference high-pressure EGR valve opening amount during the predetermined period after the fuel supply cut-off operation mode of the internal combustion engine ends.

5. A method for controlling an exhaust gas recirculation system for an internal combustion engine, the exhaust gas recirculation system including:
a turbocharger that includes a compressor arranged in an intake passage of the internal combustion engine, and a turbine arranged in an exhaust passage of the internal combustion engine;
a high-pressure EGR unit that recirculates a portion of exhaust gas back to the internal combustion engine through a high-pressure EGR passage that provides communication between the exhaust passage, at a portion upstream of the turbine; and the intake passage, at a portion downstream of the compressor;
a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
a high-pressure EGR valve that is provided in the high-pressure EGR passage and that changes a flow passage area of the high-pressure EGR passage;
a low-pressure EGR valve that is provided in the low-pressure EGR passage and that changes a flow passage area of the low-pressure EGR passage; and
a control unit,
the method comprising:
adjusting an opening amount of the high-pressure EGR valve to a reference high-pressure EGR valve opening amount determined based on an operation mode of the internal combustion engine, and adjusting an opening amount of the low-pressure EGR valve to a reference low-pressure EGR valve opening amount determined based on the operation mode of the internal combustion engine; and
correcting the reference high-pressure EGR valve opening amount based on characteristics of exhaust gas present in the low-pressure EGR passage immediately before the operation mode of the internal combustion engine is changed, and maintaining the opening amount of the high-pressure EGR valve at the corrected reference high-pressure EGR valve opening amount during a predetermined period after the operation mode of the internal combustion engine is changed, in a case where the operation mode of the internal combustion engine is changed, and
wherein
the predetermined period is a time period from when the operation mode of the internal combustion engine is changed until when an EGR rate, which is realized when the opening amount of the high-pressure EGR valve is adjusted to the reference high-pressure EGR valve opening amount and the opening amount of the low-pressure EGR valve is adjusted to the reference low-pressure EGR valve opening amount, matches a desired target EGR rate, and the EGR rate is a proportion of an amount of exhaust gas recirculated back to the internal combustion engine by the exhaust gas recirculation system to an amount of air taken in the internal combustion engine.

6. The method according to claim 5, wherein
the case where the operation mode of the internal combustion engine is changed is a case where a fuel supply cut-off operation mode of the internal combustion engine ends.

7. The method according to claim 6, wherein
the characteristics of exhaust gas present in the low-pressure EGR passage during the fuel supply cut-off operation mode are estimated based on the operation mode of the internal combustion engine immediately before the operation mode of the internal combustion engine is changed to the fuel supply cut-off operation mode.

8. The method according to claim 6, wherein,
in a case where the operation mode of the internal combustion engine is changed from a steady operation mode to the fuel supply cut-off operation mode, the low-pressure EGR valve is kept closed during the fuel supply cut-off operation mode, the reference high-pressure EGR valve opening amount is corrected based on the steady operation mode, and the opening amount of the high-pressure EGR valve is maintained at the corrected reference high-pressure EGR valve opening amount during the predetermined period after the fuel supply cut-off operation mode of the internal combustion engine ends.

9. The method according to claim 6, wherein,
in a case where the operation mode of the internal combustion engine is changed from a transient operation mode to the fuel supply cut-off operation mode, the low-pressure EGR valve is kept open during the fuel supply cut-off operation mode, and the opening amount of the high-pressure EGR valve is maintained at an opening amount that is larger than the reference high-pressure EGR valve opening amount during the predetermined period after the fuel supply cut-off operation mode of the internal combustion engine ends.

10. A method for controlling an exhaust gas recirculation system for an internal combustion engine, the exhaust gas recirculation system including:
a turbocharger that includes a compressor arranged in an intake passage of the internal combustion engine, and a turbine arranged in an exhaust passage of the internal combustion engine;
a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
a high-pressure EGR valve that is provided in the high-pressure EGR passage and that changes a flow passage area of the high-pressure EGR passage;

a low-pressure EGR valve that is provided in the low-pressure EGR passage and that changes a flow passage area of the low-pressure EGR passage; and
a control unit,
the method comprising:
adjusting an opening amount of the high-pressure EGR valve to a reference high-pressure EGR valve opening amount determined based on an operation mode of the internal combustion engine, and adjusting an opening amount of the low-pressure EGR valve to a reference low-pressure EGR valve opening amount determined based on the operation mode of the internal combustion engine; and
correcting the reference high-pressure EGR valve opening amount based on characteristics of exhaust gas present in the low-pressure EGR passage immediately before the operation mode of the internal combustion engine is changed, and maintaining the opening amount of the high-pressure EGR valve at the corrected reference high-pressure EGR valve opening amount during a predetermined period after the operation mode of the internal combustion engine is changed, in a case where the operation mode of the internal combustion engine is changed, and
wherein
in the case where the operation mode of the internal combustion engine is changed, the opening amount of the low-pressure EGR valve is adjusted, the reference high-pressure EGR valve opening amount is corrected, and the opening amount of the high-pressure EGR valve is maintained at the corrected reference high-pressure EGR valve opening amount during the predetermined period so that a target EGR rate corresponding to the changed operation mode of the internal combustion engine is achieved, and
the EGR rate is a proportion of an amount of exhaust gas recirculated back to the internal combustion engine by the exhaust gas recirculation system to an amount of air taken in the internal combustion engine.

11. The method according to claim 10, wherein
the case where the operation mode of the internal combustion engine is changed is a case where a fuel supply cut-off operation mode of the internal combustion engine ends.

12. The method according to claim 11, wherein
the characteristics of exhaust gas present in the low-pressure EGR passage during the fuel supply cut-off operation mode are estimated based on the operation mode of the internal combustion engine immediately before the operation mode of the internal combustion engine is changed to the fuel supply cut-off operation mode.

13. The method according to claim 11, wherein,
in a case where the operation mode of the internal combustion engine is changed from a steady operation mode to the fuel supply cut-off operation mode, the low-pressure EGR valve is kept closed during the fuel supply cut-off operation mode, the reference high-pressure EGR valve opening amount is corrected based on the steady operation mode, and the opening amount of the high-pressure EGR valve is maintained at the corrected reference high-pressure EGR valve opening amount during the predetermined period after the fuel supply cut-off operation mode of the internal combustion engine ends.

14. The method according to claim 11, wherein,
in a case where the operation mode of the internal combustion engine is changed from a transient operation mode to the fuel supply cut-off operation mode, the low-pressure EGR valve is kept open during the fuel supply cut-off operation mode, and the opening amount of the high-pressure EGR valve is maintained at an opening amount that is larger than the reference high-pressure EGR valve opening amount during the predetermined period after the fuel supply cut-off operation mode of the internal combustion engine ends.

15. An exhaust gas recirculation system for an internal combustion engine, comprising:
a turbocharger that includes a compressor arranged in an intake passage of the internal combustion engine, and a turbine arranged in an exhaust passage of the internal combustion engine;
a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
a high-pressure EGR valve that is provided in the high-pressure EGR passage and that changes a flow passage area of the high-pressure EGR passage;
a low-pressure EGR valve that is provided in the low-pressure EGR passage and that changes a flow passage area of the low-pressure EGR passage; and
a control unit that adjusts an opening amount of the high-pressure EGR valve to a reference high-pressure EGR valve opening amount determined based on an operation mode of the internal combustion engine, and that adjusts an opening amount of the low-pressure EGR valve to a reference low-pressure EGR valve opening amount determined based on the operation mode of the internal combustion engine,
wherein,
in a case where the operation mode of the internal combustion engine is changed to a mode where a fuel supply cut-off operation mode of the internal combustion engine ends, the control unit corrects the reference high-pressure EGR valve opening amount based on characteristics of exhaust gas present in the low-pressure EGR passage immediately before the operation mode of the internal combustion engine is changed, and maintains the opening amount of the high-pressure EGR valve at the corrected reference high-pressure EGR valve opening amount during a predetermined period after the operation mode of the internal combustion engine is changed.

16. The exhaust gas recirculation system according to claim 15, wherein
the control unit estimates the characteristics of exhaust gas present in the low-pressure EGR passage during the fuel supply cut-off operation mode based on the operation mode of the internal combustion engine immediately before the operation mode of the internal combustion engine is changed to the fuel supply cut-off operation mode.

17. The exhaust gas recirculation system according to claim 15, wherein,
in a case where the operation mode of the internal combustion engine is changed from a steady operation mode to the fuel supply cut-off operation mode, the control unit keeps the low-pressure EGR valve closed during the fuel supply cut-off operation mode, corrects the reference high-pressure EGR valve opening amount based on the steady operation mode, and maintains the opening amount of the high-pressure EGR valve at the corrected reference high-pressure EGR valve opening amount during the predetermined period after the fuel supply cut-off operation mode of the internal combustion engine ends.

18. The exhaust gas recirculation system according to claim 15, wherein,
in a case where the operation mode of the internal combustion engine is changed from a transient operation mode to the fuel supply cut-off operation mode, the control unit keeps the low-pressure EGR valve open during the fuel supply cut-off operation mode, and maintains the opening amount of the high-pressure EGR valve at an opening amount that is larger than the reference high-pressure EGR valve opening amount during the predetermined period after the fuel supply cut-off operation mode of the internal combustion engine ends.

19. An exhaust gas recirculation system for an internal combustion engine, comprising:
a turbocharger that includes a compressor arranged in an intake passage of the internal combustion engine, and a turbine arranged in an exhaust passage of the internal combustion engine;
a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
a high-pressure EGR valve that is provided in the high-pressure EGR passage and that changes a flow passage area of the high-pressure EGR passage;
a low-pressure EGR valve that is provided in the low-pressure EGR passage and that changes a flow passage area of the low-pressure EGR passage; and
a control unit that adjusts an opening amount of the high-pressure EGR valve to a reference high-pressure EGR valve opening amount determined based on an operation mode of the internal combustion engine, and that adjusts an opening amount of the low-pressure EGR valve to a reference low-pressure EGR valve opening amount determined based on the operation mode of the internal combustion engine,
wherein,
in a case where the operation mode of the internal combustion engine is changed, the control unit corrects the reference high-pressure EGR valve opening amount based on characteristics of exhaust gas present in the low-pressure EGR passage immediately before the operation mode of the internal combustion engine is changed, adjusts the opening amount of the low-pressure EGR valve, and maintains the opening amount of the high-pressure EGR valve at the corrected reference high-pressure EGR valve opening amount during a predetermined period after the operation mode of the internal combustion engine is changed so that a target EGR rate corresponding to the changed operation mode of the internal combustion engine is achieved,
and
the EGR rate is a proportion of an amount of exhaust gas recirculated back to the internal combustion engine by the exhaust gas recirculation system to an amount of air taken in the internal combustion engine.

20. The exhaust gas recirculation system according to claim 19, wherein,
the case where the operation mode of the internal combustion engine is changed is a case where a fuel supply cut-off operation mode of the internal combustion engine ends.

21. The exhaust gas recirculation system according to claim 20, wherein
the control unit estimates the characteristics of exhaust gas present in the low-pressure EGR passage during the fuel supply cut-off operation mode based on the operation mode of the internal combustion engine immediately before the operation mode of the internal combustion engine is changed to the fuel supply cut-off operation mode.

22. The exhaust gas recirculation system according to claim 20, wherein,
in a case where the operation mode of the internal combustion engine is changed from a steady operation mode to the fuel supply cut-off operation mode, the control unit keeps the low-pressure EGR valve closed during the fuel supply cut-off operation mode, corrects the reference high-pressure EGR valve opening amount based on the steady operation mode, and maintains the opening amount of the high-pressure EGR valve at the corrected reference high-pressure EGR valve opening amount during the predetermined period after the fuel supply cut-off operation mode of the internal combustion engine ends.

23. The exhaust gas recirculation system according to claim 20, wherein,
in a case where the operation mode of the internal combustion engine is changed from a transient operation mode to the fuel supply cut-off operation mode, the control unit keeps the low-pressure EGR valve open during the fuel supply cut-off operation mode, and maintains the opening amount of the high-pressure EGR valve at an opening amount that is larger than the reference high-pressure EGR valve opening amount during the predetermined period after the fuel supply cut-off operation mode of the internal combustion engine ends.

24. An exhaust gas recirculation system for an internal combustion engine, comprising:
a turbocharger that includes a compressor arranged in an intake passage of the internal combustion engine, and a turbine arranged in an exhaust passage of the internal combustion engine;
a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;

a high-pressure EGR valve that is provided in the high-pressure EGR passage and that changes a flow passage area of the high-pressure EGR passage;

a low-pressure EGR valve that is provided in the low-pressure EGR passage and that changes a flow passage area of the low-pressure EGR passage; and a control unit that adjusts an opening amount of the high-pressure EGR valve to a reference high-pressure EGR valve opening amount determined based on an operation mode of the internal combustion engine, and that adjusts an opening amount of the low-pressure EGR valve to a reference low-pressure EGR valve opening amount determined based on the operation mode of the internal combustion engine, wherein, in a case where the operation mode of the internal combustion engine is changed, the control unit corrects the reference high-pressure EGR valve opening amount based on characteristics of exhaust gas present in the low-pressure EGR passage immediately before the operation mode of the internal combustion engine is changed, and maintains the opening amount of the high-pressure EGR valve at the corrected reference high-pressure EGR valve opening amount during a predetermined period after the operation mode of the internal combustion engine is changed, and wherein the predetermined period is a time period from when the operation mode of the internal combustion engine is changed until when an EGR rate, which is realized when the opening amount of the high-pressure EGR valve is adjusted to the reference high-pressure EGR valve opening amount and the opening amount of the low-pressure EGR valve is adjusted to the reference low-pressure EGR valve opening amount, matches a desired target EGR rate, and the EGR rate is a proportion of an amount of exhaust gas recirculated back to the internal combustion engine by the exhaust gas recirculation system to an amount of air taken in the internal combustion engine.

25. The exhaust gas recirculation system according to claim 24, wherein, the case where the operation mode of the internal combustion engine is changed is a case where a fuel supply cut-off operation mode of the internal combustion engine ends.

26. The exhaust gas recirculation system according to claim 25, wherein the control unit estimates the characteristics of exhaust gas present in the low-pressure EGR passage during the fuel supply cut-off operation mode based on the operation mode of the internal combustion engine immediately before the operation mode of the internal combustion engine is changed to the fuel supply cut-off operation mode.

27. The exhaust gas recirculation system according to claim 25, wherein, in a case where the operation mode of the internal combustion engine is changed from a steady operation mode to the fuel supply cut-off operation mode, the control unit keeps the low-pressure EGR valve closed during the fuel supply cut-off operation mode, corrects the reference high-pressure EGR valve opening amount based on the steady operation mode, and maintains the opening amount of the high-pressure EGR valve at the corrected reference high-pressure EGR valve opening amount during the predetermined period after the fuel supply cut-off operation mode of the internal combustion engine ends.

28. The exhaust gas recirculation system according to claim 25, wherein, in a case where the operation mode of the internal combustion engine is changed from a transient operation mode to the fuel supply cut-off operation mode, the control unit keeps the low-pressure EGR valve open during the fuel supply cut-off operation mode, and maintains the opening amount of the high-pressure EGR valve at an opening amount that is larger than the reference high-pressure EGR valve opening amount during the predetermined period after the fuel supply cut-off operation mode of the internal combustion engine ends.

* * * * *